March 22, 1960 R. L. LICH 2,929,338
RAILWAY VEHICLE TRUCK STRUCTURE
Filed Oct. 3, 1955 6 Sheets-Sheet 1

INVENTOR.
RICHARD L. LICH
BY Rodney Bedell
ATTORNEY

March 22, 1960 R. L. LICH 2,929,338
RAILWAY VEHICLE TRUCK STRUCTURE
Filed Oct. 3, 1955 6 Sheets-Sheet 4

INVENTOR.
RICHARD L. LICH
BY Rodney Bedell
ATTORNEY.

March 22, 1960 R. L. LICH 2,929,338
RAILWAY VEHICLE TRUCK STRUCTURE
Filed Oct. 3, 1955 6 Sheets-Sheet 5

INVENTOR.
RICHARD L. LICH
BY Rodney Bedell
ATTORNEY.

March 22, 1960 R. L. LICH 2,929,338
RAILWAY VEHICLE TRUCK STRUCTURE
Filed Oct. 3, 1955 6 Sheets-Sheet 6

INVENTOR.
RICHARD L. LICH
BY
Rodney Bedell
ATTORNEY.

United States Patent Office 2,929,338
Patented Mar. 22, 1960

2,929,338

RAILWAY VEHICLE TRUCK STRUCTURE

Richard L. Lich, Ferguson, Mo., assignor to General Steel Castings Corporation, Granite City, Ill., a corporation of Delaware Application October 3, 1955, Serial No. 537,935

17 Claims. (Cl. 105—192)

The invention relates to railway rolling stock and more particularly to truck structure and the mounting of a vehicle body upon the truck structure.

The general object of the invention is to effect reduction in the weight of the truck structure by loading it at the sides rather than at the center plate, as in conventional railway trucks. Trucks made according to the present invention would be particularly adaptable for application to light weight vehicle body structures.

It is contemplated that the support of the vehicle body upon the truck shall be through air springs which, due to their variable rate characteristics, are particularly adapted for light weight cars.

It is a further object of the invention to adapt the truck structure for supporting a vehicle body through air spring units.

In the accompanying drawings illustrating selected embodiments of the invention:

Figure 1:
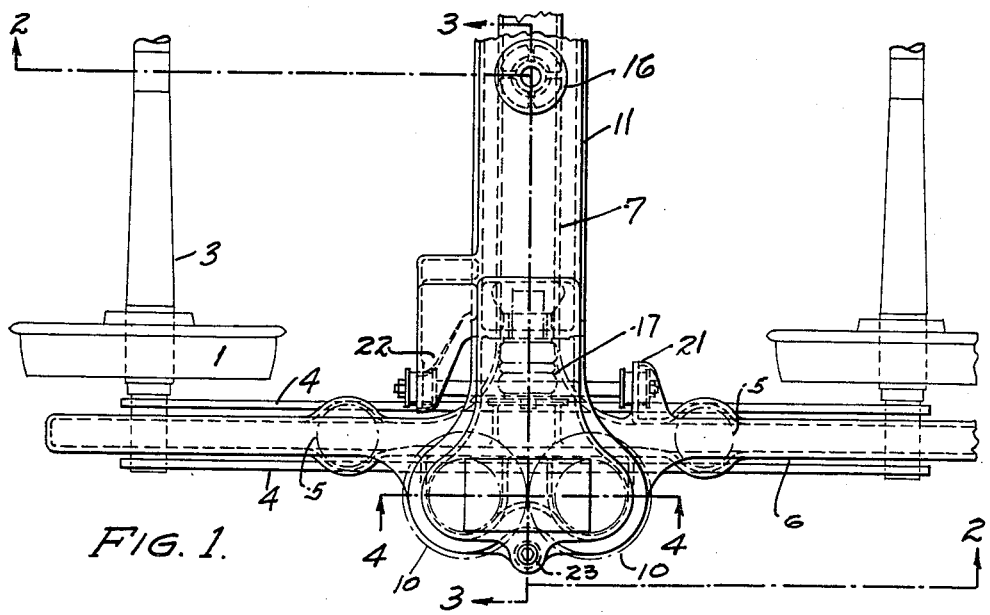
Figure 1 is a top view of one longitudinal half of a four-wheel truck.
Figure 2:
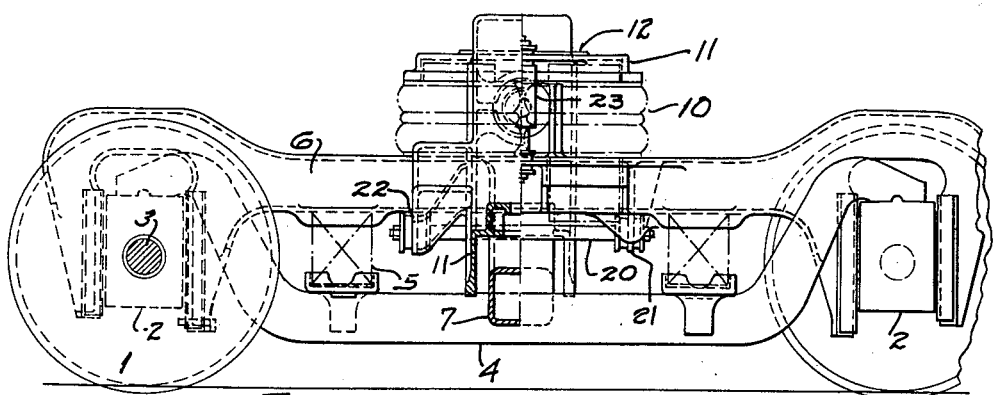
Figure 2 is a side elevation and vertical longitudinal section of the truck on line 2—2 of Figure 1.
Figure 3:
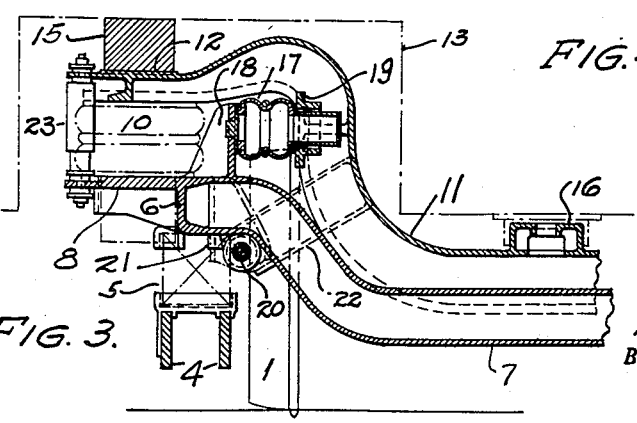
Figure 3 is a transverse vertical section on line 3—3 of Figure 1 and indicates a portion of the vehicle underframe mounted upon the truck.
Figure 4:
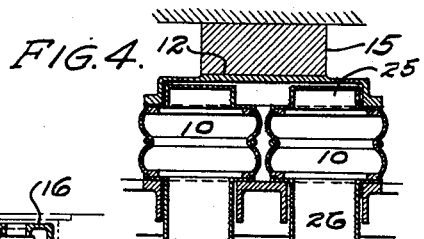
Figure 4 is a detail longitudinal vertical section taken on line 4—4 of Figure 1.
Figure 6:
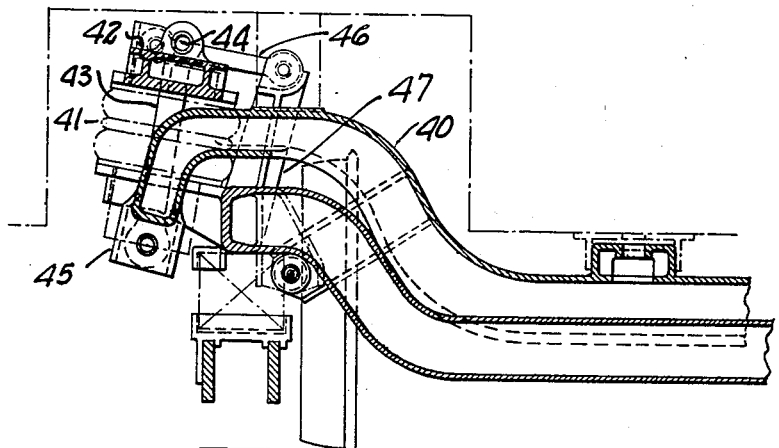
Figure 7:
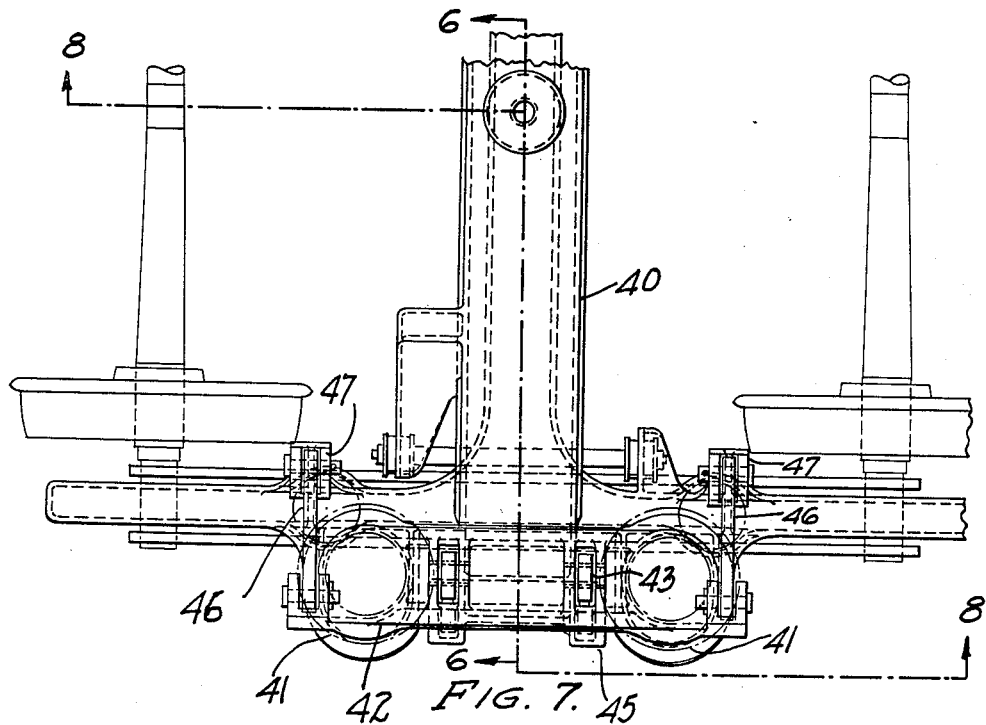
Figure 8:
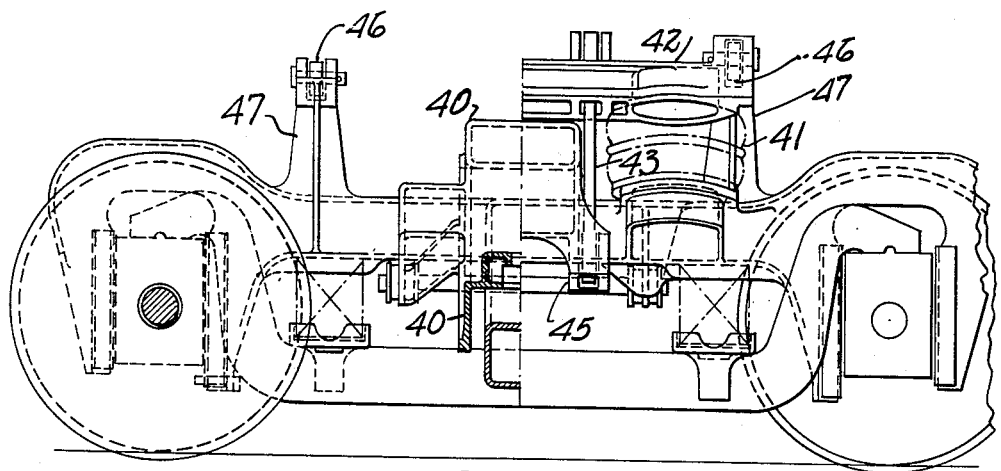

Figures 6, 7, and 8 correspond to Figures 3, 1, and 2 respectively, but illustrate a third form of the invention, Figure 6 being taken on line 6—6 of Figure 7 and Figure 8 being taken on line 8—8 of Figure 7.

Figure 9:
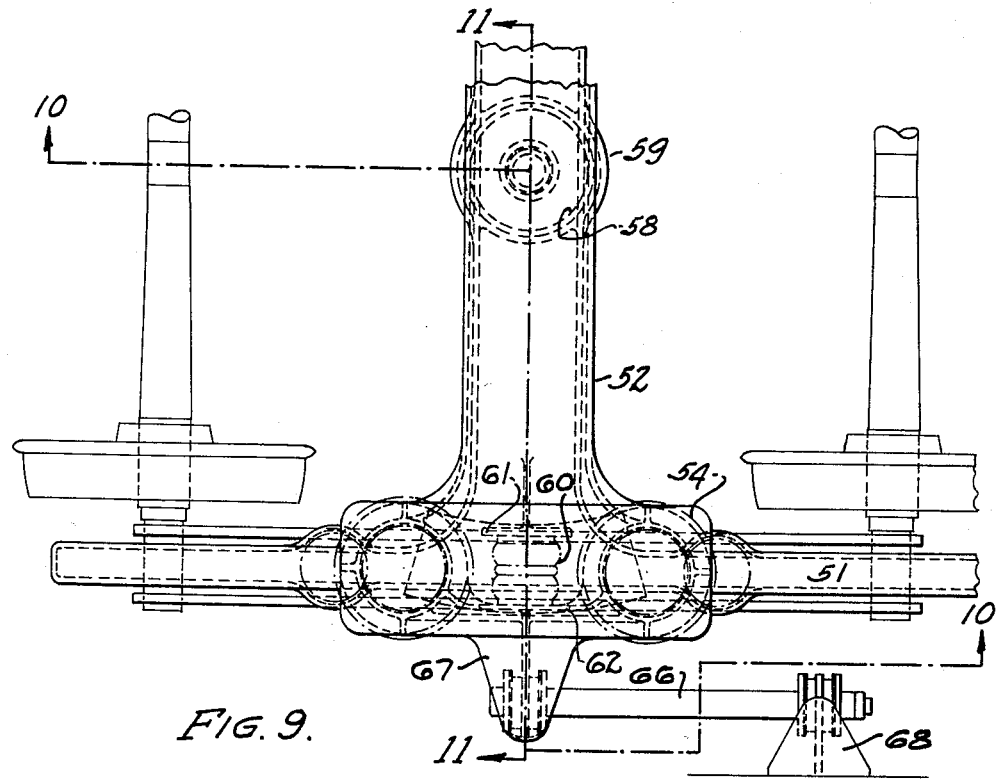
Figure 10:
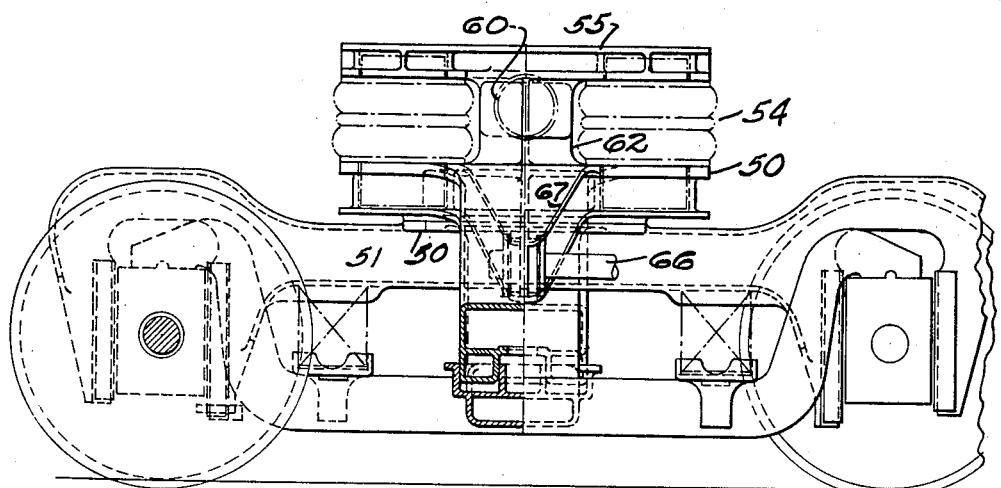
Figure 11:
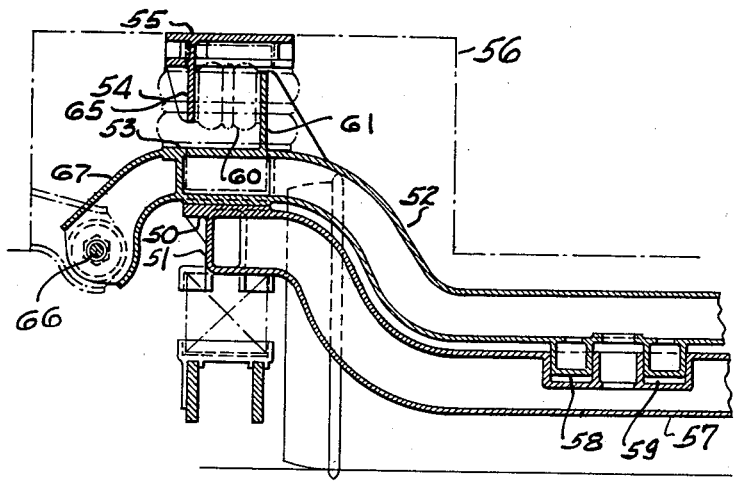

Figures 9, 10, and 11 correspond to Figures 7, 8, and 6 respectively, but illustrate a fourth form of the invention, Figure 10 being on line 10—10 of Figure 9 and Figure 11 being on line 11—11 of Figure 9.

Figure 12:
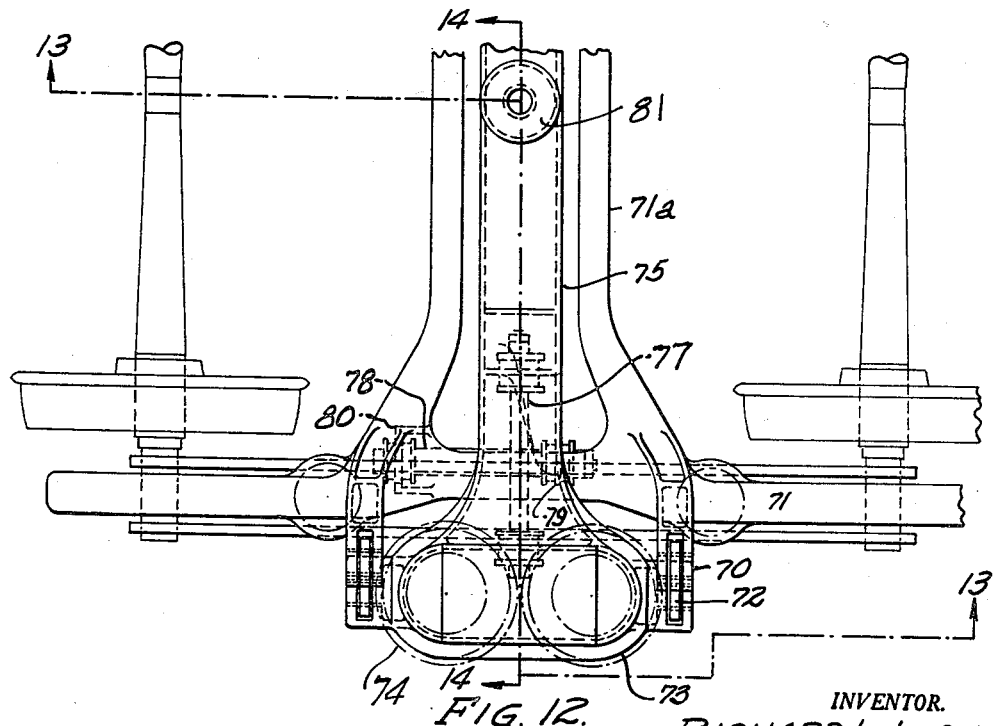
Figure 13:
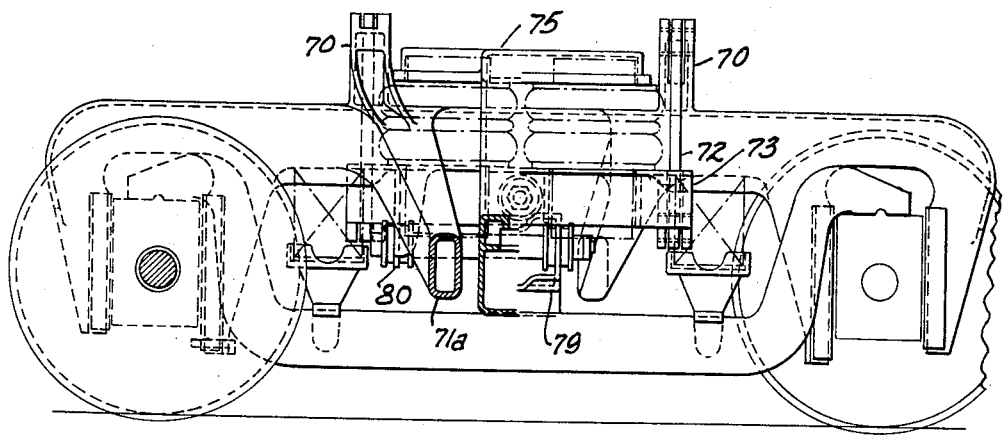
Figure 14:
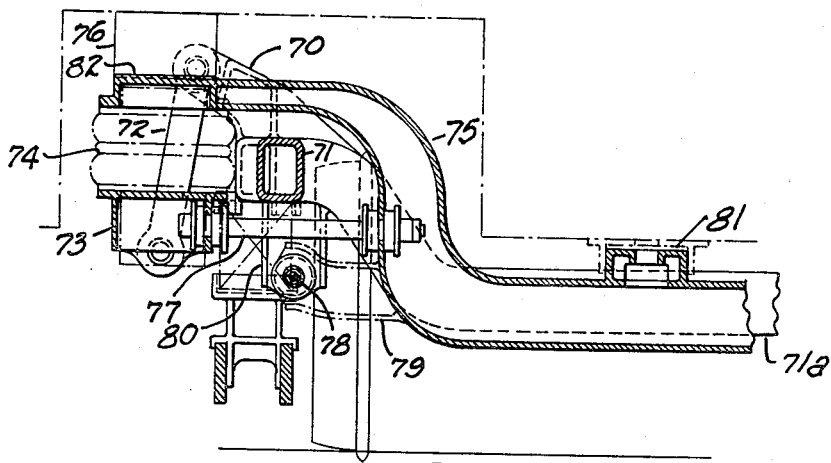

Figures 12, 13, and 14 correspond to Figures 9, 10, and 11, but illustrate a fifth form of the invention, Figure 13 being on line 13—13 of Figure 12 and Figure 14 being a section on line 14—14 of Figure 12.

Figure 15:
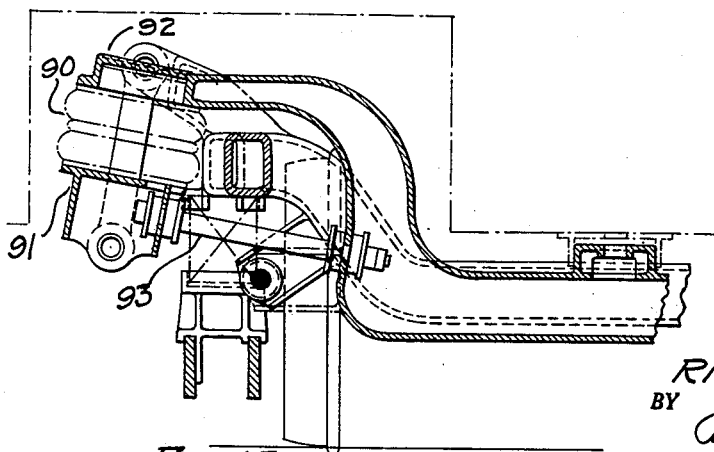

Figure 15 corresponds to Figure 14, but illustrates a sixth form of the invention.

In the first form of the invention shown in Figures 1–4, the truck includes wheels 1, journal boxes 2, axles 3, drop equalizers 4, extending between and supported by journal boxes on the same side of the truck, equalizer springs 5, and a truck frame including wheel pieces 6. The equalizers, springs and wheel pieces are outboard of the wheels. The wheel pieces are connected by a transverse transom structure 7 preferably formed by casting it integral with the wheel pieces.

Spring seats 8 are integral with wheel pieces 6 and project outwardly therefrom. Springs 10 are mounted on seats 8 with their axes substantially vertical. A bolster 11 extends from side to side of the truck over wheel pieces 6 and beyond the same and is mounted upon springs 10. Each end portion of the bolster includes elements 12 adapted to support the vehicle car body underframe indicated at 13 either directly or through an intermediate bearing 15. The intermediate portion of bolster 11 may include a pivot member 16 for swiveling the truck on the intermediate portion of the vehicle underframe but it is to be understood that member 16 does not constitute a customary center plate and does not carry any part of the vehicle load.

The bolster springs 10 may yield laterally of the truck to accommodate relative movement of the bolster and frame due to the track inequalities and curved track. Such relative lateral movement is yieldingly resisted by a horizontally disposed spring 17 at each side of the truck seated between an upstanding bracket 18 on the truck frame and an opposing web 19 on the bolster. Relative movement of the bolster and truck frame longitudinally of the truck is prevented by an anchor 20 having one end secured to a bracket 21 on the truck frame and its other end secured to a bracket 22 on the bolster. Preferably a snubber 23 has its ends connected to the bolster and truck frame to prevent undue oscillations of the bolster springs. The bolster springs are arranged in pairs at each side of the truck and each spring is shown as comprising a bellows-like air container with upper and lower compartments 25 and 26 for increased air capacity.

Figure 5:
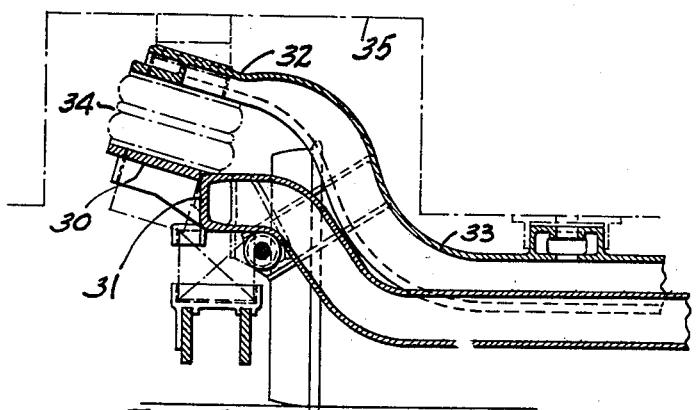
Figure 5 is a section corresponding to Figure 3, but illustrating a second form of the invention.

The second form of the invention illustrated in Figure 5 includes wheel, axle, journal box, equalizer, equalizer spring and truck frame structure generally similar to that previously described, but the spring seats 30 are inclined upwardly and outwardly from the truck frame side 31 and the corresponding end portions 32 of the bolster 33 are similarly inclined. The axes of the springs 34 will be inclined upwardly and inwardly of the truck. Accordingly, springs 34 will not only yieldingly support the bolster and the vehicle body underframe 35, but will yieldingly resist relative lateral movement of the truck frame and bolster.

The third form of the invention shown in Figures 6, 7, and 8 embodies wheel, axle, journal box, equalizer, equalizer spring, truck frame, bolster spring seat, and bolster spring structure corresponding to that shown in Figure 5, but instead of the end portions of the bolster 40 resting directly upon the upper ends of the bolster springs 41, the latter carry elongated spring caps 42 from which hangers 43 are pivotally suspended at 44 to swing transversely of the truck. The lower ends of hangers 43 are pivotally connected to lugs 45 depending from bolster 40. Anchors 46 connect the spring caps with upwardly and inwardly projecting arms 47 on the truck frame. Preferably anchors 46 have their axes at right angles to the spring axes to best resist the forces tending to distort the springs and move the spring caps laterally. With this arrangement and due to the swinging of hangers 43, the bolster may move transversely of the truck frame without laterally distorting its springs 41.

In the fourth form of the invention, shown in Figures 9–11, the wheel, axle, journal box, equalizer, equalizer spring, and truck frame structure correspond to that previously described except that the bolster supporting brackets 50 on the truck frame are centered over wheel pieces 51 and the bolster 52 rests directly upon brackets 50 and the end portions of the bolster over the wheel pieces form seats 53 for the air springs 54 which project upwardly from the bolster and have caps 55 secured to the vehicle body underframe 56. In this form of the invention, the bolster swivels on the truck with the body, and to accommodate such movement the intermediate portions of the bolster and the truck frame transom 57 are provided with internesting annular members 58 and 59 respectively. Relative movement of the bolster and truck frame transversely of the truck is yieldingly resisted by horizontally disposed springs 60 positioned between upstanding web 61 on the bolster and depending web 62 on spring caps 55.

To hold the bolster against pivotal movement on the underframe and to avoid undue lateral distortion of springs 54 because of such pivotal movement of the bolster and of the frame, there are provided anchors 66 secured at their ends to brackets 67 on the bolster and brackets 68 on the body underframe.

In the fifth form of the invention shown in Figures 12–14, the wheel, axle, journal box, equalizer, equalizer spring, and truck frame structure correspond to those previously described except that arms 70 project upwardly and outwardly from the frame wheel pieces 71 at the end of spaced transoms 71a and swing hangers 72 are pivotally suspended from arms 70 and the swinging ends of hangers 72 pivotally mount spring seats 73 which carry springs 74. The end portions of bolster 75 are mounted on springs 74 and the bolster end portions mount the vehicle body underframe support elements 76 which correspond to those shown in Figure 3. Spring seats 73 are spaced from the truck frame by anchors 77 which accommodate angling of the spring seats but prevent their movement laterally of the bolster. Longitudinal anchors 78 are connected at their opposite ends to brackets 79 on the bolster and to brackets 80 on the truck frame. These anchors hold the bolster and truck frame against relative movement longitudinally of the truck. The intermediate portion of the bolster is between and at substantially the same level as the transoms and is pivotally connected to the body underframe at 81 and body supports 76 slide on the bolster support elements 82.

The sixth form of the invention shown in Figure 15 corresponds generally to that just described, but the axes of the springs 90 are inclined upwardly and inwardly of the truck instead of being disposed vertically, as indicated in Figure 14. Accordingly, the spring seats 91, supported by the hangers, and the spring caps 92 on the bolster are inclined at right angles to the spring axes. Preferably the anchors 93, which connect spring seats 91 with the bolster, are inclined at right angles to the spring axes to best resist the forces tending to distort the springs laterally.

In each form of the invention, the truck frame is spring supported outboard of the wheels and provides outboard supports for the end portions of a transverse bolster, which in turn support the sides of the vehicle underframe so that all of the vertical load on the truck is transmitted in substantially vertical planes from the body underframe to the axle journals. This structure eliminates the need for heavy cross members which must transfer a load from the center of the car or truck to the journals.

Due to the fact that air springs possess variable rate characteristics, whereby the resistance of the spring increases with increased load, the structure is particularly well adapted for light weight cars and for high speed operation.

The details of the structure may be varied without departing from the spirit of the invention and the exclusive use of those modifications coming within the scope of the claims is contemplated.

What is claimed is:

1. In a railway vehicle truck, spaced wheeled axles, a truck frame extending between and carried by said axles and including wheel pieces, extending lengthwise of the truck outboard of the wheels, and also including spaced transverse transoms rigid with said wheel pieces, bolster carrying structure mounted on the truck frame at opposite sides of the truck and positioned wholly outboard of the wheels, a load-carrying bolster extending transversely of the truck between said transoms and over said wheel pieces and supported solely on said structure and provided on its end portions with structure positioned wholly outboard of the wheels and forming the sole support on the truck for a vehicle body mounted on the truck, at least one of said structures including vertically yielding springs.

2. In a railway vehicle truck, spaced wheeled axles, equalizers extending between and mounted on said axles outboard of the wheels, springs on each equalizer spaced apart lengthwise of the equalizer, a truck frame extending between and carried on said springs and including wheel pieces, extending lengthwise of the truck outboard of the wheels, and also including spaced transverse transoms rigid with said wheel pieces, bolster carrying structure mounted on the frame at opposite sides of the truck and positioned wholly outboard of the wheels, a load-carrying bolster extending transversely of the truck between said transoms and over said wheel pieces and transoms and supported solely on said structure and provided on its end portions with structure positioned wholly outboard of the wheels and forming the sole support on the truck for a vehicle body mounted on the truck, at least one of said structures including vertically yielding springs.

3. In a railway vehicle truck, spaced wheeled axles, a truck frame extending between and carried by said axles and including wheel pieces, extending lengthwise of the truck outboard of the wheels, and transverse transom means connecting and rigid with said wheel pieces, bolster carrying structure mounted on the truck frame at opposite sides of the truck and positioned wholly outboard of the wheels, a load-carrying bolster extending transversely of the truck and centered with respect to said transverse transom means and passing over said wheel pieces and supported solely on said structure and provided on its end portions with structure positioned wholly outboard of the wheels and forming the sole support on the truck for a vehicle body mounted on the truck, at least one of said structures including vertically yielding springs.

4. A railway vehicle truck according to claim 3 in which each wheel piece includes an upright part facing inboard of the truck and the bolster includes an opposing part positioned inboard of said wheel piece, there being a yielding device between and connected to said parts to resist the relative movements of the truck frame and bolster transversely of the truck.

5. A railway vehicle truck according to claim 3 in which each end portion of the bolster is of inverted U section with a horizontal cross web, which supports the vehicle body, and with depending side webs, there being a device partially housed between said side webs and yielding transversely of the truck and connected to and engaged by substantially upright portions of the truck frame and bolster and resisting their relative movement transversely of the truck.

6. A railway vehicle truck according to claim 3 in which the opposing faces of the support structure mounted on the frame and supporting the bolster are inclined upwardly and outwardly from the frame wheel piece, and said latter mentioned structure includes a spring with a longitudinal axis inclined upwardly and inwardly from its support, and the spring yieldingly resists relative movement of the bolster and frame transversely of the truck.

7. A railway vehicle truck according to claim 3 in which the end portions of the bolster are slidably mounted on the wheel pieces to shift about the pivot connection as a center, and the vehicle body supporting spring units yield horizontally to accommodate such shifting, there being means at the end portions of the bolster in addition to the spring units for engaging a vehicle body frame mounted thereon to yieldingly resist such shifting.

8. A railway vehicle truck according to claim 3, in which the springs comprise air chambers with flexible sides yielding to the movements of the spring supporting and supported parts transversely of the spring axes.

9. A railway vehicle truck according to claim 3 in which the bolster support structure includes rigid spring seats on the truck frame wheel pieces outboard of the wheels for mounting the vertically yielding springs.

10. A railway vehicle truck according to claim 3 in which the structure mounted on the truck frame includes swing hangers pivotally suspended from the frame to swing transversely of the truck, and the vertically yielding springs have seats on the swing hangers and directly support the bolster.

11. A railway vehicle truck according to claim 10 in which the springs extend upwardly above the level of the frame wheel pieces and the end portions of the bolster extend over the truck wheel pieces and then downwardly and are connected to the hangers near the level of the bottom of the frame wheel pieces.

12. A railway vehicle truck according to claim 10 in which the spring seats are pivotally supported by the swinging ends of the hangers and the axes of the springs are inclined upwardly and inwardly of the truck, and the bolster portions engaging the springs are inclined upwardly and outwardly of the truck whereby the springs offer resistance to the relative movement of the frame and bolster transversely of the truck.

13. A structure according to claim 12 in which an anchor extends transversely of the truck from the lower portion of the bolster to each spring seat to maintain the lateral spacing of the spring seat transversely of the truck.

14. A truck according to claim 3 in which the bolster has a vertical axis pivot connection at its center to the transom means and is slidably supported at its ends on said wheel pieces and the vertically yielding springs are seated on the bolster directly over its points of support on the wheel pieces.

15. A railway vehicle truck according to claim 14 in which an anchor device extends lengthwise of the truck with one end pivotally connected to the end portion of the bolster and its other end arranged for connection to vehicle body framing.

16. A railway vehicle truck according to claim 3 in which the springs are mounted on the truck frame and hangers have pivot supports on the springs and swing transversely of the truck and support the bolster from their swinging ends.

17. A railway vehicle truck according to claim 16 in which laterally extending anchors connect the hanger pivot supports and truck frame for preventing movement of the hanger pivot supports transversely of the truck.

References Cited in the file of this patent

UNITED STATES PATENTS

| Number | Name | Date |
|---|---|---|
| 553,298 | Baker | Jan. 21, 1896 |
| 1,399,709 | Holloway | Dec. 6, 1921 |
| 1,763,434 | Latshaw | June 10, 1930 |
| 1,772,328 | Symington et al. | Aug. 5, 1930 |
| 1,821,296 | Drenning | Sept. 1, 1931 |
| 2,330,994 | Prantl | Oct. 5, 1943 |
| 2,333,059 | Travilla et al. | Oct. 26, 1943 |
| 2,448,768 | Eksergian | Nov. 22, 1949 |
| 2,741,996 | Kolesa | Apr. 17, 1956 |